(12) United States Patent
Futamura

(10) Patent No.: US 12,531,838 B2
(45) Date of Patent: Jan. 20, 2026

(54) INFORMATION MANAGEMENT SYSTEM HAVING FIREWALL WITH TRANSPARENCY SETTING FUNCTION

(71) Applicant: PZP CO., Nagoya (JP)

(72) Inventor: Norihito Futamura, Aichi (JP)

(73) Assignee: PZP CO.

( * ) Notice: Subject to any disclaimer, the term of this patent is extended or adjusted under 35 U.S.C. 154(b) by 0 days.

(21) Appl. No.: 18/940,854

(22) Filed: Nov. 8, 2024

(65) Prior Publication Data

US 2025/0133064 A1    Apr. 24, 2025

Related U.S. Application Data

(63) Continuation of application No. PCT/JP2023/017407, filed on May 9, 2023.

(30) Foreign Application Priority Data

May 10, 2022 (JP) ................................. 2022-077642
Jul. 20, 2022 (JP) ................................. 2022-115954

(51) Int. Cl.
*H04L 9/40* (2022.01)

(52) U.S. Cl.
CPC ............ *H04L 63/029* (2013.01); *H04L 63/10* (2013.01)

(58) Field of Classification Search
CPC .............................. H04L 63/029; H04L 63/10
See application file for complete search history.

(56) References Cited

U.S. PATENT DOCUMENTS

| 8,930,576 B1* | 1/2015 | Roberts ............ H04N 21/25875 |
| | | 704/E15.001 |
| 9,306,943 B1* | 4/2016 | Bailey ................. H04W 12/088 |

(Continued)

FOREIGN PATENT DOCUMENTS

| JP | 2005318178 A | 11/2005 |
| JP | 2012050019 A | 3/2012 |

(Continued)

OTHER PUBLICATIONS

[Introduction] What is WebRTC? Explaining the general mechanism and server configuration (signaling/TURN/SFU), Agora, http://ip,vcube.com/sdk/blog/webric-general-server-configuration-signaling-turn-sfu., dated Aug. 22, 2024, 1-8pgs.

(Continued)

*Primary Examiner* — Jason Chiang
(74) *Attorney, Agent, or Firm* — Best Mode IP Law, PLLC; Yusuke Hirai

(57) ABSTRACT

The information management system includes a firewall connected to a network camera (i.e., a device) having an image capturing function and a sound collecting function and a management server performing an authentication process for authenticating a user using the user terminal between the management server and the user terminal and allowing the user terminal to connect to the network camera via the firewall. The information management system is configured to acquire, via the firewall, media data including an image captured by the network camera and an audio collected by the network camera from the network camera to which the user terminal is allowed to connect based on a connection permission condition defined in the management server.

11 Claims, 7 Drawing Sheets

(56) References Cited

U.S. PATENT DOCUMENTS

| | | | |
|---|---|---|---|
| 9,736,194 B1* | 8/2017 | Rao | H04L 65/65 |
| 9,811,820 B2* | 11/2017 | Pitroda | G06Q 20/10 |
| 9,900,178 B2* | 2/2018 | Ylimartimo | H04L 61/2567 |
| 11,330,341 B1* | 5/2022 | Daily | H04L 67/63 |
| 11,632,428 B2* | 4/2023 | Tikhomirov | H04L 67/12 |
| | | | 709/220 |
| 2003/0191848 A1* | 10/2003 | Hesselink | H04L 67/14 |
| | | | 709/229 |
| 2005/0149481 A1* | 7/2005 | Hesselink | H04L 63/0209 |
| 2006/0173997 A1* | 8/2006 | Tullberg | H04L 67/025 |
| | | | 709/224 |
| 2007/0192464 A1* | 8/2007 | Tullberg | H04L 67/025 |
| | | | 709/223 |
| 2009/0074184 A1* | 3/2009 | Baum | G06F 16/954 |
| | | | 709/201 |
| 2010/0064341 A1* | 3/2010 | Aldera | H04W 8/245 |
| | | | 726/1 |
| 2011/0016319 A1* | 1/2011 | Lundberg | H04L 9/0819 |
| | | | 713/170 |
| 2012/0158862 A1* | 6/2012 | Mosko | H04L 65/1096 |
| | | | 709/228 |
| 2013/0050514 A1* | 2/2013 | Nakamura | H04N 23/66 |
| | | | 348/207.11 |
| 2014/0359004 A1* | 12/2014 | Zhou | H04L 61/10 |
| | | | 709/203 |
| 2015/0113172 A1* | 4/2015 | Johnson | H04L 67/75 |
| | | | 709/245 |
| 2015/0319615 A1* | 11/2015 | E | H04W 12/062 |
| | | | 726/4 |
| 2017/0237708 A1* | 8/2017 | Klaghofer | H04L 65/1045 |
| | | | 726/12 |
| 2018/0198755 A1* | 7/2018 | Domangue | H04W 4/021 |
| 2019/0056893 A1* | 2/2019 | Tokuchi | G06F 3/1204 |
| 2019/0379735 A1* | 12/2019 | Huang | H04L 67/1091 |
| 2020/0162458 A1* | 5/2020 | Setlur | H04N 21/4402 |
| 2020/0214053 A1* | 7/2020 | Tsuchihashi | H04W 76/14 |
| 2020/0220746 A1* | 7/2020 | Shribman | H04W 48/18 |
| 2022/0060498 A1* | 2/2022 | Head, Jr. | H04L 12/4641 |
| 2022/0070262 A1* | 3/2022 | Kitchen | H04L 65/1026 |
| 2022/0210197 A1* | 6/2022 | Vaner | H04L 63/20 |
| 2022/0272179 A1* | 8/2022 | Decenzo | G08B 25/00 |
| 2022/0397686 A1* | 12/2022 | Scacchi | G01S 19/485 |
| 2024/0187430 A1* | 6/2024 | Holbrook | G06N 5/01 |

FOREIGN PATENT DOCUMENTS

| | | |
|---|---|---|
| JP | 2016024535 A | 2/2016 |
| JP | 2016534607 A | 11/2016 |
| JP | 2018098605 A | 6/2018 |
| JP | 2020113970 A | 7/2020 |
| JP | 2020191620 A | 11/2020 |
| JP | 2022107987 A | 7/2022 |
| WO | WO2018084033 A1 | 5/2018 |
| WO | WO2018225806 A1 | 12/2018 |

OTHER PUBLICATIONS

WebRTC Realtime Communication for the Open Web Platform, ACM, vol. 19, Issue 11, Niklas Blum et.al., dated Mar. 16, 2021, 1-19pgs.

* cited by examiner

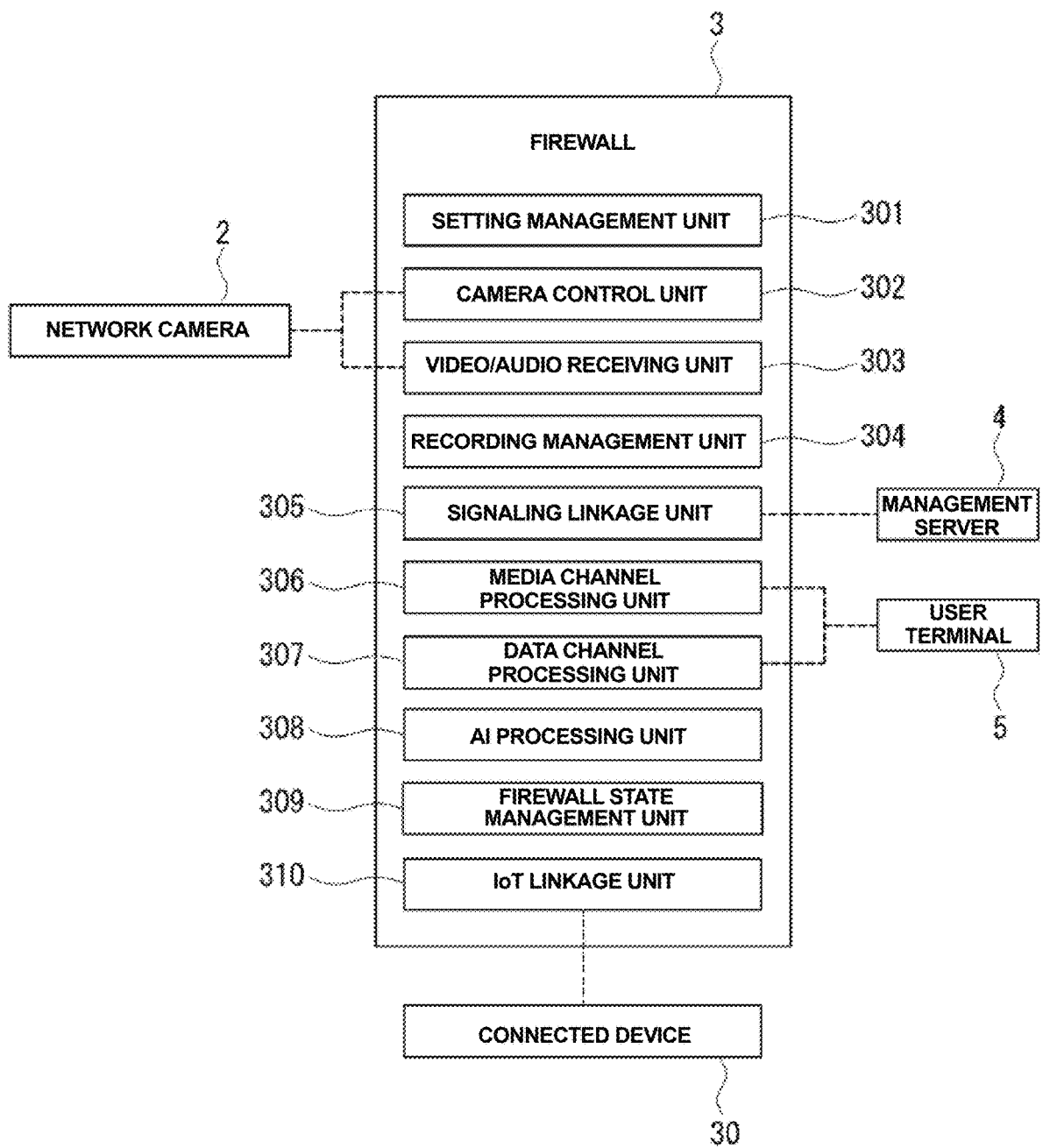

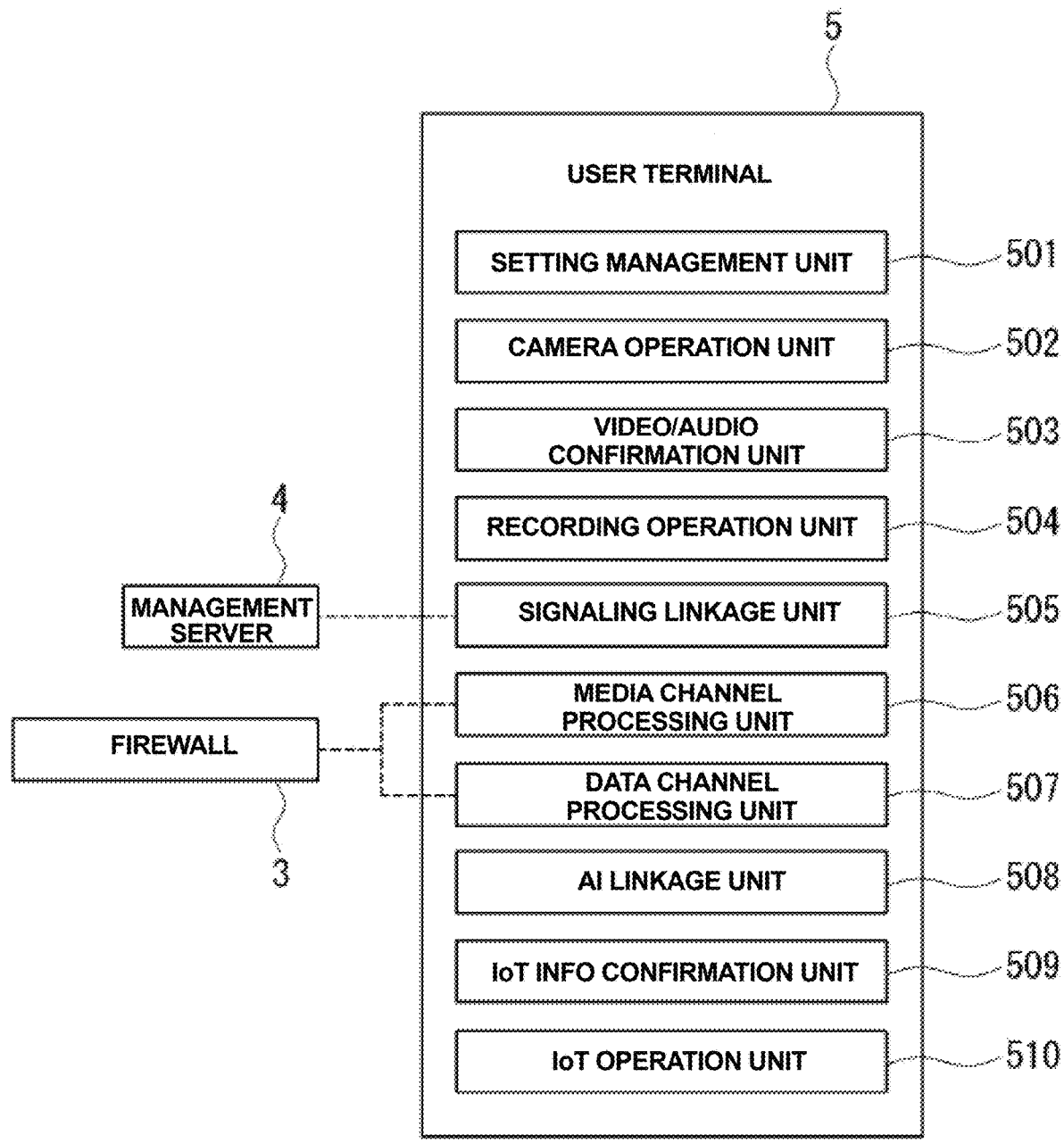

INFORMATION MANAGEMENT SYSTEM HAVING FIREWALL WITH TRANSPARENCY SETTING FUNCTION

CROSS REFERENCE TO RELATED APPLICATION

This application is a continuation application of International Patent Application No. PCT/JP2023/017407 filed on May 9, 2023, which designated the U.S. and claims the benefit of priority from Japanese Patent Application No. 2022-077642 filed on May 10, 2022 and Japanese Patent Application No. 2022-115954 filed on Jul. 20, 2022. The entire disclosure of the above applications is incorporated herein by reference.

TECHNICAL FIELD

The present invention relates to an information management system.

BACKGROUND

There has been known a surveillance camera system where images captured by a network camera can be viewed through a client terminal (a user terminal). In such a surveillance camera system, a client terminal authenticated by a server can view the images of multiple network cameras connected to the server.

SUMMARY

However, in a conventional surveillance camera system, as long as the client terminal (a user terminal) was authenticated by the server, the images of the network camera were able to be viewed at any time, or the images of multiple network cameras connected to the server were able to be viewed at any time. In other words, viewing of network camera images was not sufficiently restricted, and thus there was a safety problem.

The present disclosure provides an information management system that is configured to sufficiently and reliably control an access from a user terminal to a device, and a video and audio of the device can be checked from the user terminal with ensured safety.

The information management system of one aspect of the present disclosure includes: a firewall that is connected to a device having at least one of an image capturing function and a sound collecting function; and a management server that is configured to: perform an authentication process to authenticate a user who uses a user terminal between the user terminal and the management server; and allow the user terminal to connect to the device via the firewall. The user terminal for which the authentication process was performed by the management server is allowed to transmit and receive, via the firewall between the user terminal and the device to which the user terminal is allowed to connect via the firewall based on a connection permission condition.

In the information management system, the connection permission condition may be defined by connection basic information that is set in advance in the management server and linkage information that is information having a higher priority over the connection basic information and is acquired by the management server from an outside.

Further, WebRTC technology may be used for communication between the user terminal and the firewall, and P2P communication between the user terminal and the firewall may be established using the management server as a signaling server, Furthermore, the firewall may perform a transparency setting for the firewall such that, when establishing P2P communication between the user terminal and the firewall using WebRTC technology, (i) the user terminal can connect to the device via the firewall using information related to the user terminal and the firewall that is exchanged, via the management server as the signaling server, between the user terminal and the firewall and (ii) the media data of the device can be transmitted to the terminal device via the firewall.

In addition, the user terminal and the firewall may be configured to control a media channel used for transmitting and receiving the media data of the device between the user terminal and the firewall.

Further, the user terminal and the firewall may be configured to: transmit and receive data other than the media data of the device between the user terminal and the firewall; and control a data channel used for transmitting and receiving the data between the user terminal and the firewall.

The present disclosure can provide an information management system that is configured to sufficiently and reliably control an access from a user terminal to a device, and a video and audio of the device can be checked from the user terminal with ensured safety.

BRIEF DESCRIPTION OF DRAWING

FIG. 6 is a functional block diagram showing a functional configuration of a firewall in an information management system according to a third embodiment.

FIG. 7 is a functional block showing a functional configuration of a user terminal in the information management system according to the third embodiment.

DESCRIPTION OF EMBODIMENTS

Figure 1:
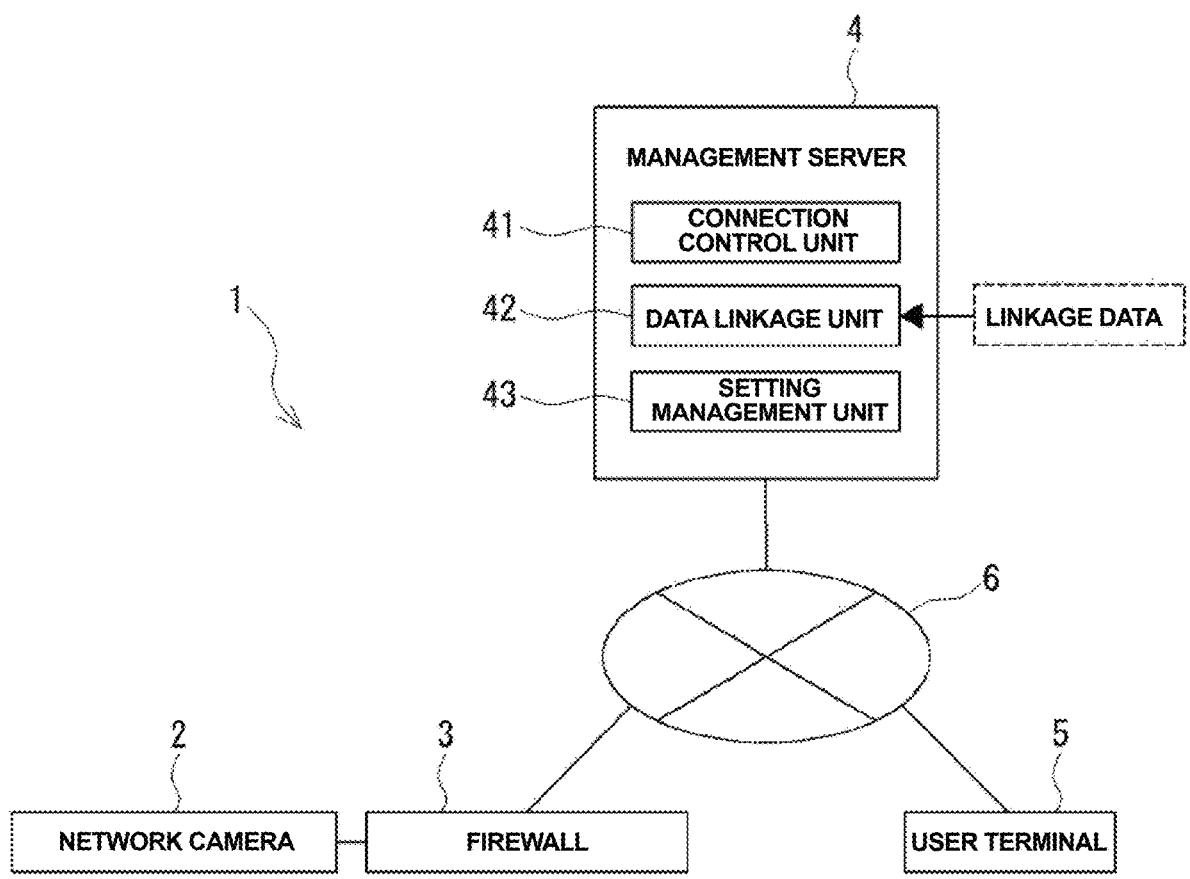
FIG. 1 is an explanatory diagram showing a configuration of an information management system according to a first embodiment.

Hereinafter, embodiments of a restaurant system and the like will be described with reference to the drawings. In the embodiment, since the components having the same reference numerals perform the same operation, the description may be omitted again.

First Embodiment

An information management system 1 according to the present embodiment is used to provide a service in which a parent who entrusts a child to a nursery school can check the state of the child at the nursery school via a network such as the Internet.

As shown in FIG. 1, the information management system 1 includes a network camera 2 (a device), a firewall 3, a management server 4, and a user terminal 5. The firewall 3 and the management server 4 are communicatively connected via a network 6 such as the Internet. Similarly, the management server 4 and the user terminal 5 are communicatively connected to each other via the network 6.

The network camera 2 is a camera with a sound collecting microphone and is installed at a predetermined location. The network camera 2 has an image capturing function for capturing video and a sound collecting function for collecting sound. The network camera 2 can capture images of a view at a predetermined location and collect sound around the location. In the present embodiment, the network camera 2 is installed, for example, in a classroom of a nursery school, a garden, or the like.

The network camera 2 is connected to the network 6 via the firewall 3. The network camera 2 distributes media data to an outside via the network 6. The media data includes the video (i.e., video data) captured by the network camera 2 and the collected sound (i.e., audio data). Further, the network camera 2 is also remotely controlled from the outside via the network 6.

The firewall 3 is a type of network device and is placed between the network 6 and the network camera 2. The firewall 3 controls communication (in other words, an access) from the outside to the network camera 2 via the network 6. The firewall 3 also controls communication (in other words, an access) from the network camera 2 to the outside via the network 6.

The firewall 3 has a transparency setting function. The firewall 3 allows, based on the transparency setting, communication from a specific transmitter to pass therethrough, but prevents, based on the transparency setting, communication from another transmitter from passing therethrough to control communication from the outside to the network camera 2. Further, the firewall 3 allows, based on the transparency setting, communication to a specific receiver to pass therethrough, but prevents, based on the transparency setting, communication to another specific receiver from passing therethrough to control communication from the network camera 2 to the outside.

The management server 4 is a cloud server that is used via the network 6. The management server 4 has a function of performing, between the management server 4 and the user terminal 5, an authentication process for authenticating a user who uses the user terminal 5, a function of allowing the user terminal 5 to connect to the network camera 2 via the firewall 3, and the like. The functions of the management server 4 will be described later. As in the present embodiment, the management server 4 may be a virtual server such as a cloud server, or a physical server such as a server device that physically exists.

The user terminal 5 is a terminal device of a user who uses the information management system 1. The user here is, for example, a parent who entrusts his/her child to a nursery school. The user terminal 5 has a display function (e.g., a liquid crystal display, etc.) of displaying images of the network camera 2 and a playback function (e.g., a speaker, etc.) of reproducing audio.

As the user terminal 5, for example, a personal computer (PC), a mobile terminal such as a smartphone or a tablet device can be used. The user terminal 5 does not necessarily need to be a physical device, but may be a virtual device. Although FIG. 1 shows only one user terminal 5, the information management system 1 may be actually used by a plurality of user terminals 5.

Next, the functions of the firewall 3 will be described.

The firewall 3 has a controlling function including a CPU, memory, and the like. The CPU executes various processes in accordance with a computer program (hereinafter, simply referred to as a "program") stored on memory to present various functions of the firewall 3. Further, the firewall 3 also has a storage function of storing data and programs necessary to execute various processes by the control function, and a communication function of controlling communication related to various information exchanged with other devices connected via the network 6.

Figure 2:
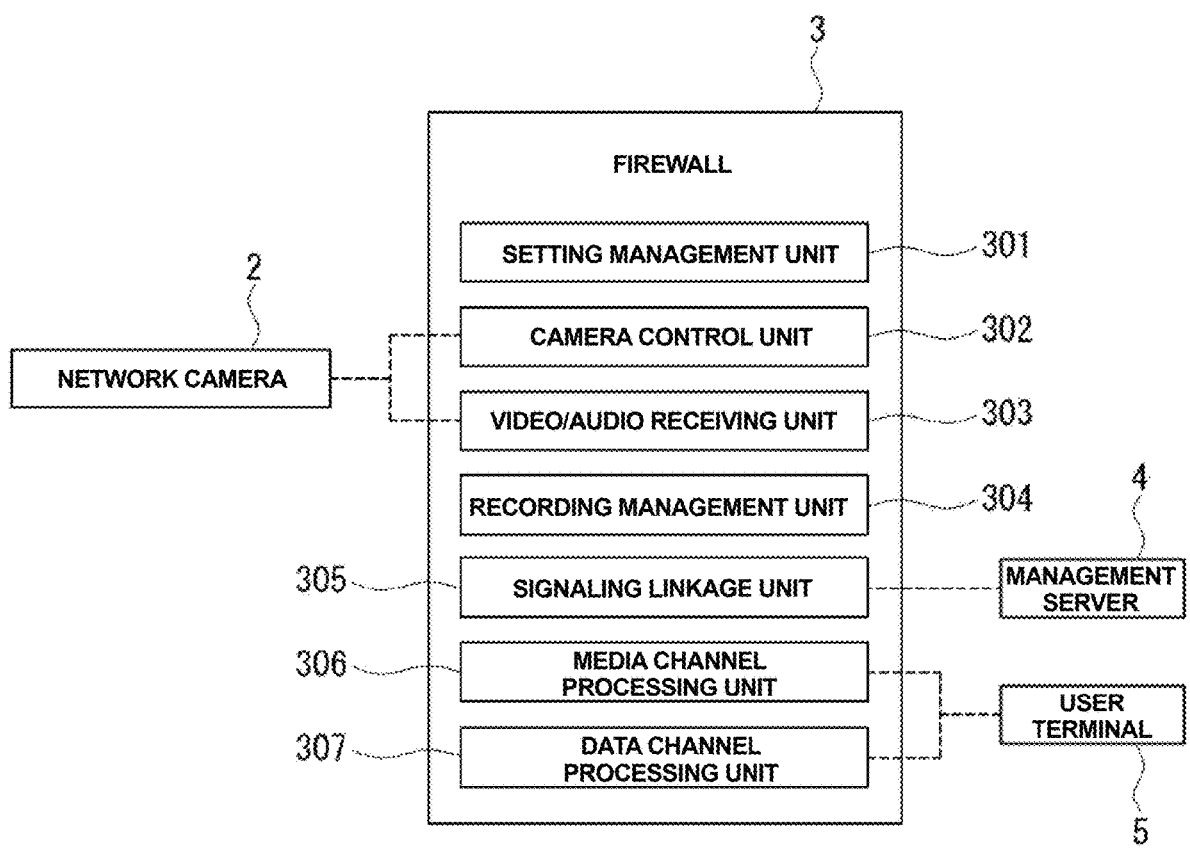
FIG. 2 is a functional block showing a functional configuration of a firewall in the information management system according to the first embodiment.

As shown in FIG. 2, the control function of the firewall 3 includes a setting management unit 301, a camera control unit 302, a video/audio receiving unit 303, a recording management unit 304, a signaling linkage unit 305, a media channel processing unit 306, and a data channel processing unit 307.

The setting management unit 301 provides information related to the system of the firewall 3 (OS: Operating System, application, etc.) and various setting information related to other control functions. In addition, the setting management unit 301 updates the information related to the system of the firewall 3, and also registers, changes, and deletes various setting information. In addition, the setting management unit 301 executes and manages the transparency settings of the firewall 3, maintains information of the transparency settings that has been set, and deletes unnecessary transparency settings.

The camera control unit 302 controls the network camera 2 based on operation information transmitted from the user terminal 5. Specifically, the camera control unit 302 operates zooming or swing of the network camera 2 and changes the shooting mode of the network camera 2.

The video/audio receiving unit 303 receives video/audio from the network camera 2 and transmits the received video data and audio data (hereinafter, may be referred to as "video/audio") to the recording management unit 304 and the media channel processing unit 306, which will be described later.

The recording management unit 304 records the video/audio of the network camera 2 in the storage device built into the firewall 3 based on various setting information managed by the setting management unit 301 of the firewall 3 and operation information transmitted from the user terminal 5. In addition, the recording management unit 304 manages information related to sound/video recording, such as identification information of the network camera 2, trigger information for recording (i.e., user identification information, etc.), date and time of starting recording and date and time of ending recording, and the like.

The signaling linkage unit 305 links the firewall 3 and the management server 4 (a signaling server) when performing a communication connecting process between the user terminal 5 and the firewall 3 using WebRTC (Web Real-Time Communication) technology, which will be described later.

The media channel processing unit 306 controls a media channel used for transmitting and receiving the video/audio of the network camera 2 when transmitting and receiving the video/audio of the network camera 2 between the firewall 3 and the user terminal 5 using WebRTC.

The data channel processing unit 307 controls the data channel used for transmitting and receiving data when transmitting and receiving the data such as operation information other than the video/audio from the network camera 2 (e.g., operation information of the network camera 2 and the firewall 3), files, messages, and the like between the firewall 3 and the user terminal 5 using the WebRTC.

Next, the functions of the management server 4 will be described.

The management server 4 has a control function including a CPU, memory, and the like. The CPU executes various processes according to the program stored on the memory to present various functions of the management server 4. Further, the management server 4 includes a storage function of storing data and programs necessary for various processing by the control function, and a communication function of controlling communication related to various information exchanged with other devices connected via the network 6.

As shown in FIG. 1, the control function of the management server 4 includes a connection control unit 41, a data linkage unit 42, and a setting management unit 43.

The connection control unit 41 has an authentication function of executing an authentication process between the connection control unit 41 and the user terminal 5. The authentication process here includes authentication of a user using the user terminal 5 and authentication of the user terminal 5 itself. Only the authentication of a user may be performed, or both the authentication of a user and the authentication of the user terminal 5 may be performed. For the authentication process performed between the connection control unit 41 and the user terminal 5, an advanced authentication method that causes impersonate to be difficult may be used, such as two-step authentication or multi-factor authentication.

Further, the connection control unit 41 has a connection control function of controlling the user terminal 5 authenticated with the user to connect to the network camera 2 via (through) the firewall 3. Specifically, the connection control unit 41 determines whether to allow the user terminal 5 authenticated with the user to connect to the network camera 2 via the firewall 3 (through) based on a connection permission condition defined by the setting management unit 43, which will be described later.

The data linkage unit 42 acquires linkage data necessary for the connection permission (i.e., the connection permission condition) of the user terminal 5 in the connection control unit 41 from the outside, and registers and updates the acquired linkage data in the setting management unit 43.

The setting management unit 43 is necessary for determining the connection permission of the user terminal 5 in the connection control unit 41, and has a function of managing, e.g., connection basic information that was set in advance, linkage data acquired by the data linkage unit 42 from the outside, and setting information for setting a relationship between the firewall 3 and information on devices connected to the firewall 3.

Here, the connection basic information is static information that was set in advance by an administrator of the information management system 1 using a terminal device for management. The connection basic information includes information on dates and time zones on which the user terminal 5 is allowed to connect to the network camera 2 via the firewall 3 and check the video and audio of the network camera 2.

The linkage data is information having a higher priority over the connection basic information, and is dynamic information that is different from the static connection basic information. The linked data includes information of year, month, and day on which a user is able to connect, information of connection start time, information of connection end time, disapproval information of disapproving the device, for which the connection basic information allows the user to connect, to connect and the expiration date of the disapproval information (the expiration date may be indefinite), approval information of approving the device, for which the connection basic information does not allow the user to connect, to connect and the expiration date of the approval information (the expiration date may be indefinite), information for disabling user information and disabling the start date and time information, information for enabling user information and enabling the start date and time information, information for disabling device information and disabling the start date and time information, information for enabling the device information and enabling the start date and time information, information for disabling the information of the firewall 3 and disabling the start date and time information, and the like.

The setting information includes information for identifying the firewall 3, an authentication method for authenticating the firewall 3 by the management server 4, information for identifying each of ports for connecting devices to the firewall 3, information for identifying the device connected to the firewall 3, information for identifying the type of the device connected to the firewall 3, type information such as video and audio that can be used for each device type, information for identifying each of connected devices that are connected to the ports of the firewall 3.

Next, the functions of the user terminal 5 will be described.

The user terminal 5 has a controlling function including a CPU, memory, and the like. The CPU executes various processes according to programs stored on the memory to present various functions of the user terminal 5. Further, the user terminal 5 has a storage function of storing data and programs necessary for various processing by the controlling function, and a communication function of controlling communication related to various information exchanged with other devices that are connected to the user terminal 5 via the network 6.

Figure 3:
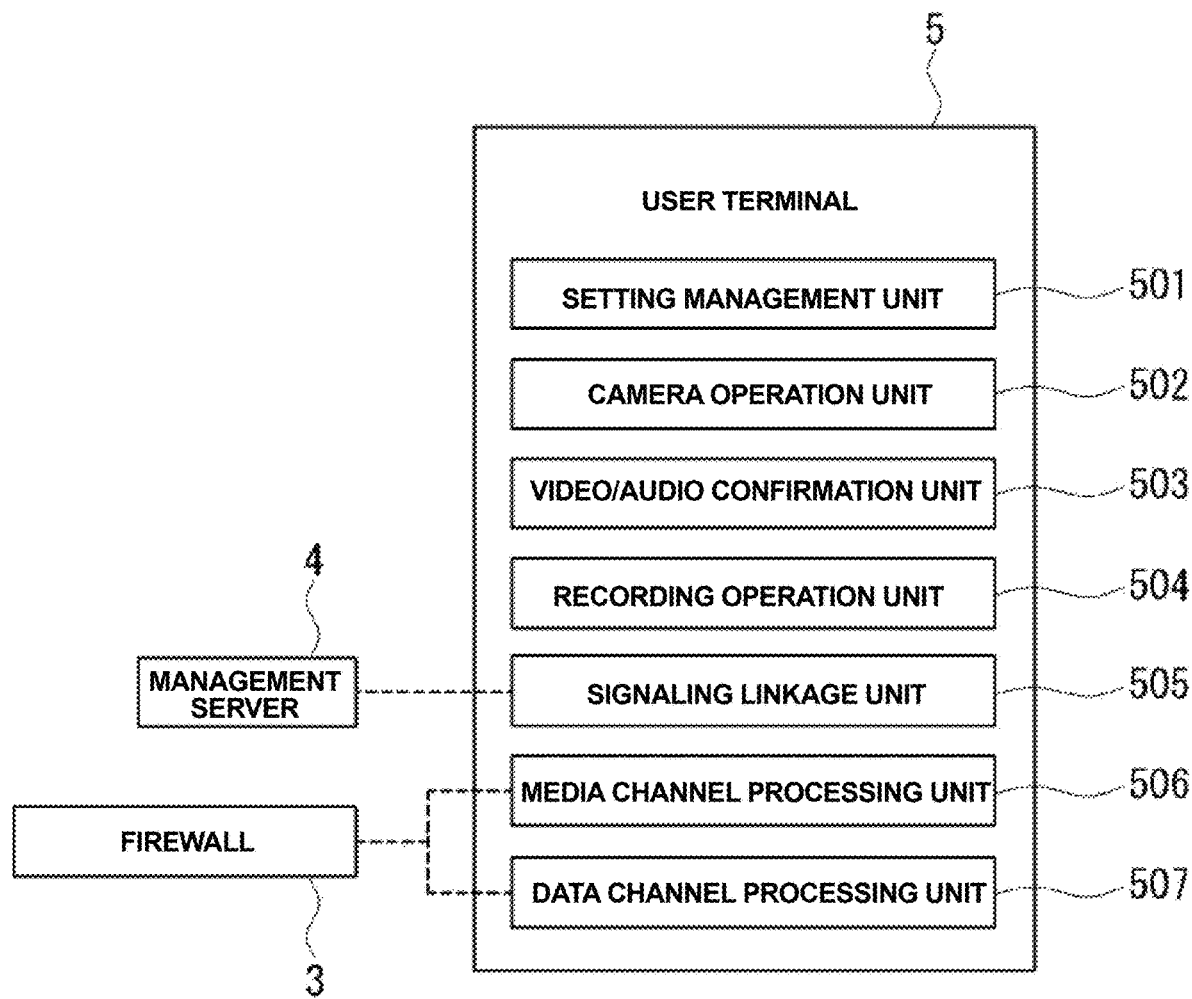
FIG. 3 is a functional block showing a functional configuration of a user terminal in the information management system according to the first embodiment.

As shown in FIG. 3, the controlling function of the user terminal 5 includes a setting management unit 501, a camera operation unit 502, a video/audio confirmation unit 503, a recording operation unit 504, a signaling linkage unit 505, a media channel processing unit 506, and a data channel processing unit 507. In the present embodiment, the controlling function of the user terminal 5 is realized based on the programs including a web application using a web browser.

The setting management unit 501 manages various setting information related to each function of the web application and other control functions. In addition, the setting management unit 501 manages a copy of the setting information related to the system of the firewall 3 (to confirm, register, change, delete, etc. the setting information from the web application). In addition, the setting management unit 501 manages information related to the system of the firewall 3 (information related to OS, application, etc.).

The camera operation unit 502 remotely controls the network camera 2 connected to the firewall 3. Specifically, the camera control unit 302 operates zooming or swing of the network camera 2 and changes the shooting mode of the network camera 2.

The video/audio confirmation unit 503 provides a function of displaying a real-time video of the network camera 2 connected to the firewall 3, playing back the audio, and confirming the video/audio. Further, by operating the recording operation unit 504, the video/audio confirmation unit 503 provides a function of displaying the recorded video, playing back the recorded audio, and confirming the video/audio.

The recording operation unit 504 performs operations such as recording the video/audio of the network camera 2 in the storage device built into the firewall 3, listing the recorded video/audio data, selecting, playing, and deleting the video/audio data.

The signaling linkage unit 505 links the user terminal 5 and the management server 4 (i.e., the signaling server) when performing a communication connecting process between the user terminal 5 and the firewall 3 using WebRTC (Web Real-Time Communication) technology described later.

The media channel processing unit 506 controls a media channel used for transmitting and receiving the video/audio of the network camera 2 when transmitting and receiving the video/audio of the network camera 2 between the firewall 3 and the user terminal 5 using WebRTC.

The data channel processing unit 507 controls a data channel used for transmitting and receiving data such as operation information other than the video/audio of the network camera 2 (for example, operation information for the network camera 2 and the firewall 3) messages, and files using WebRTC between the firewall 3 and the user terminal 5.

An administrator of the information management system 1 performs maintenance on the information of the network camera 2 and the firewall 3 and maintenance on the user's information as appropriate using the management terminal device.

Next, the flow of processes of using the information management system 1 will be described. As a premise for using the information management system 1, the connection basic information and the setting information as described above have been set in advance in the management server 4, and the linkage data is acquired from the outside as necessary. Further, the firewall 3 has been authenticated by the management server 4 in advance. An advanced authentication method such as the two-step authentication or multi-factor authentication may be used for the authentication process of the firewall 3 by the management server 4.

First, a user who wants to use the information management system 1 (who wants to check the video/audio of the network camera 2) accesses the management server 4 using the user terminal 5. The management server 4 performs the authentication process between the management server 4 and the user terminal 5. Specifically, the management server 4 authenticates the user who uses the user terminal 5 based on the setting information.

Then, the management server 4 determines whether to allow the user terminal 5 used by the user, who has been authenticated by the management server 4 and logged in to the management server 4, to connect to the network camera 2 via the firewall 3. This determination is performed based on the connection permission condition defined by the connection basic information and the linkage data registered in the management server 4.

When the management server 4 permits the connection of the user terminal 5, the communication connecting process between the user terminal 5 and the firewall 3 is performed. In the present embodiment, WebRTC (Web Real-Time Communication) technology is used for communication between the user terminal 5 and the firewall 3. Specifically, P2P (Peer to Peer) communication between the user terminal 5 and the firewall 3 is established using the management server 4 as a signaling server. Hereinafter, the procedure for the communication connecting process will be described.

Figure 4:
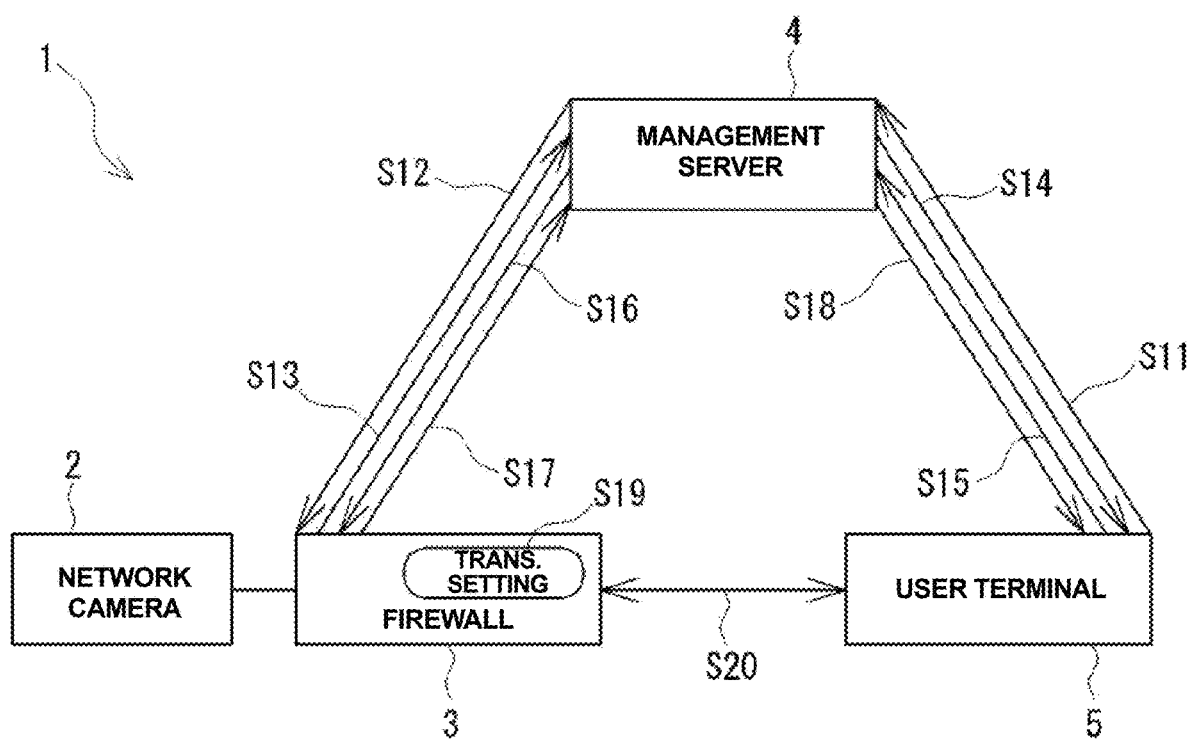
FIG. 4 is an explanatory diagram showing a communication connection process between the user terminal and the firewall in the information management system according to the first embodiment.

As shown in FIG. 4, at step S11, the user terminal 5 transmits Offer SDP (Session Description Protocol) to the management server 4. At step 12, the management server 4 sends the Offer SDP to the firewall 3. The firewall 3 registers the Offer SDP.

Next, at step S13, the firewall 3 transmits Answer SDP to the management server 4. At step S14, the management server 4 transmits the Answer SDP to the user terminal 5. The user terminal 5 registers the Answer SDP. Thereby, the user terminal 5 and the firewall 3 exchange codec information available in each of the user terminal 5 and the firewall 3, network information such as the IP address and the port number of each of the user terminal 5 and the firewall 3, and the like.

Next, at step S15, the user terminal 5 transmits an ICE (Interactive Connectivity Establishment) candidate to the management server 4. At step S16, the management server 4 transmits the ICE candidate to the firewall 3.

Next, at step S17, the firewall 3 transmits the ICE candidate to the management server 4. At step S18, the management server 4 transmits the ICE candidate to the user terminal 5. Accordingly, the user terminal 5 and the firewall 3 exchange candidate information for a route through which communication can be continuously performed.

Next, at step S19, the firewall 3 performs the transparency setting using the SDP and the ICE candidate exchanged between the user terminal 5 and the firewall 3. Specifically, the firewall 3 performs the transparency setting such that the user terminal 5 can be connected to the network camera 2 via (transparent) the firewall 3, and the video/audio of the network camera 2 can be transmitted to the user terminal 5 via (transparent) the firewall 3.

Next, at step S20, P2P communication between the user terminal 5 and the firewall 3 is established. That is, a secure communication path through which communication can be continuously performed between the user terminal 5 and the firewall 3 is established without the management server 4. As a result, a secure communication path through which communication can be continuously performed is established between the user terminal 5 and the network camera 2 via the firewall 3.

Then, a user accesses the network camera 2 from the user terminal 5 via the firewall 3 and requests the video/audio of the network camera 2. The network camera 2 transmits the captured video data and the collected audio data to the user terminal 5 via the firewall 3. At the user terminal 5, the video received from the network camera 2 is displayed, and the audio is played. Accordingly, the user can acquire and confirm the video and the audio of the network camera 2 from the user terminal 5 in real time. It is also possible for the user to acquire and check the recorded video and audio.

Thereafter, if communication is explicitly disconnected by the user terminal 5, it is determined that the video and audio confirmation of the network camera 2 by the user has been completed, and the transparency setting of the firewall 3 at step S19 is deleted. As a result, the communication path between the user terminal 5 and the firewall 3 is disconnected. The same applies to a situation where communication is explicitly disconnected by the firewall 3 or the management server 4.

In addition, if an unintentional communication disconnection occurs due to a communication failure or the like and communication is not restored even after a certain period of time (for example, 5 minutes), or if the operation of the user terminal 5, the firewall 3, or the management server 4 is stopped due to a dead battery, a power outage, or the like, the transparency setting of the firewall 3 at step S19 is deleted.

Next, advantageous effects according to the information management system 1 in the present embodiment will be described.

According to the information management system 1 in the present embodiment, the user terminal 5 (a user) for which an authentication process (an authentication of the user by the management server 4) has been performed between the management server 4 and the user terminal 5 is configured to acquire, via the firewall 3, a video and an audio (i.e., media data) of the network camera 2 to which the user terminal 5 is allowed to connect based on the connection permission condition defined at the management server 4.

That is, the user terminal 5 (a user) cannot check the video and audio of the network camera 2 unless the user is authenticated by the management server 4 and is allowed to connect to the network camera 2 based on the connection permission condition. Therefore, connection (i.e., an access) from the user terminal 5 to the network camera 2 can be sufficiently and reliably controlled. Further, the user terminal 5 that is allowed to connect can check the video and audio of the network camera 2 with ensured safety due to the firewall 3.

Further, in the information management system 1, the connection permission condition is defined by (i) the connection basic information that has been set in advance in the management server 4 and (ii) the linkage data that is information having a higher priority over the connection basic information and is acquired by the management server 4 from the outside. Therefore, the connection permission condition can be appropriately changed using various elements (i.e., the linkage data). As a result, the connection from the user terminal 5 to the network camera 2 can be controlled more accurately.

Further, WebRTC technology is used for communication between the user terminal 5 and the firewall 3, and P2P communication between the user terminal 5 and the firewall 3 is established using the management server 4 as a signaling server. Therefore, a secure communication path through which communication between the user terminal 5 and the firewall 3 is continuously performed can be established without placing a load on the management server 4.

Further, when establishing P2P communication between the user terminal 5 and the firewall 3 using WebRTC, the firewall 3 performs the transparency setting using the information on the user terminal 5 and the firewall 3 that is exchanged between the user terminal 5 and the firewall 3 via the management server 4 as a signaling server such that the user terminal 5 can connect to the network camera 2 via the firewall 3 and the video and audio of the network camera 2 can be transmitted to the user terminal 5 via the firewall 3. Therefore, the transparency setting of the firewall 3 can be easily and reliably performed.

In the present embodiment, the transparency setting of the firewall 3 is performed using information on the user terminal 5 and the firewall 3 that is exchanged between the user terminal 5 and the firewall 3 via the management server 4. However, information required for the transparency setting of the firewall 3 such as information on the user terminal 5 and the firewall 3 that are managed by the management server 4 may be further used in addition to the above-described information.

Further, the user terminal 5 and the firewall 3 are configured to control the media channel used for transmitting and receiving a video and an audio (media data) of the network camera 2 between the user terminal 5 and the firewall 3. Therefore, media data can be smoothly transmitted and received between the user terminal 5 and the firewall 3 using WebRTC.

Further, the user terminal 5 and the firewall 3 can transmit and receive data (e.g., operation information, files, messages, etc. of the network camera 2 and the firewall 3) other than the video and audio (i.e., the media data) of the network camera 2 between the user terminal 5 and the firewall 3. The user terminal 5 and the firewall 3 control the data channel used for transmitting and receiving data therebetween. Therefore, data can be smoothly transmitted and received between the user terminal 5 and the firewall 3 using WebRTC.

Further, the firewall 3 can provide the following advantageous effects. A conventional firewall controlled communication based on the contents of the communication (packets, etc.) and allowed approved communication to pass through the firewall. However, if the communication was tampered with, it was difficult to determine whether the communication transmitter, communication receiver, and the like were authentic, which allowed for "impersonation".

However, in the present embodiment, the management server 4 authenticates the firewall 3 in advance and authenticates the user who is using the user terminal 5. Therefore, it is guaranteed that the firewall 3 that is a communication transmitter of the video and audio of the network camera 2, the user terminal 5 that is a communication receiver, and the user who is using the user terminal are authentic. As a result, it is possible to prevent "impersonation" based on the contents of communication between the user terminal 5 and the firewall 3.

Further, the information management system 1 according to the present embodiment can provide a service where a parent who entrusts a child to a nursery school can check the state of the child at the nursery school via a network such as the Internet. Then, the following problems can be solved.

Typically, the nursery school provided a service where a parent was able to check the video and audio of the network camera 2 installed in the nursery school only on business days and during the business hours of the nursery school. However, even though a child of user "A" was absent from the nursery school, it was found that user A had checked the video and audio of the network camera 2 in the nursery school, which brought concerns to other parent users. In view of this, according to the present disclosure, confirmation of the video and audio of the network camera 2 is allowed as follows.

As a condition for a user to check the video and audio of the network camera 2, the user is only allowed to check while the user's child stays at the nursery school. For a specific method, a user's card is scanned at the start and end of childcare for the user's child to record the time of the start and end of childcare. By uploading the user's identification ID and the time data of the start and end of childcare onto the management server 4 as the linkage data, the user can check the video and audio of the network camera 2 only "from the start to end of childcare". If the user's child is absent from the nursery school, the service is not available to the user because the user's identification ID and the time data of the start and end of childcare are not uploaded to the management server 4 as the linkage data. In addition, if the user stops entrusting his/her child to the nursery school, the service is no longer available to the user.

Second Embodiment

Figure 5:
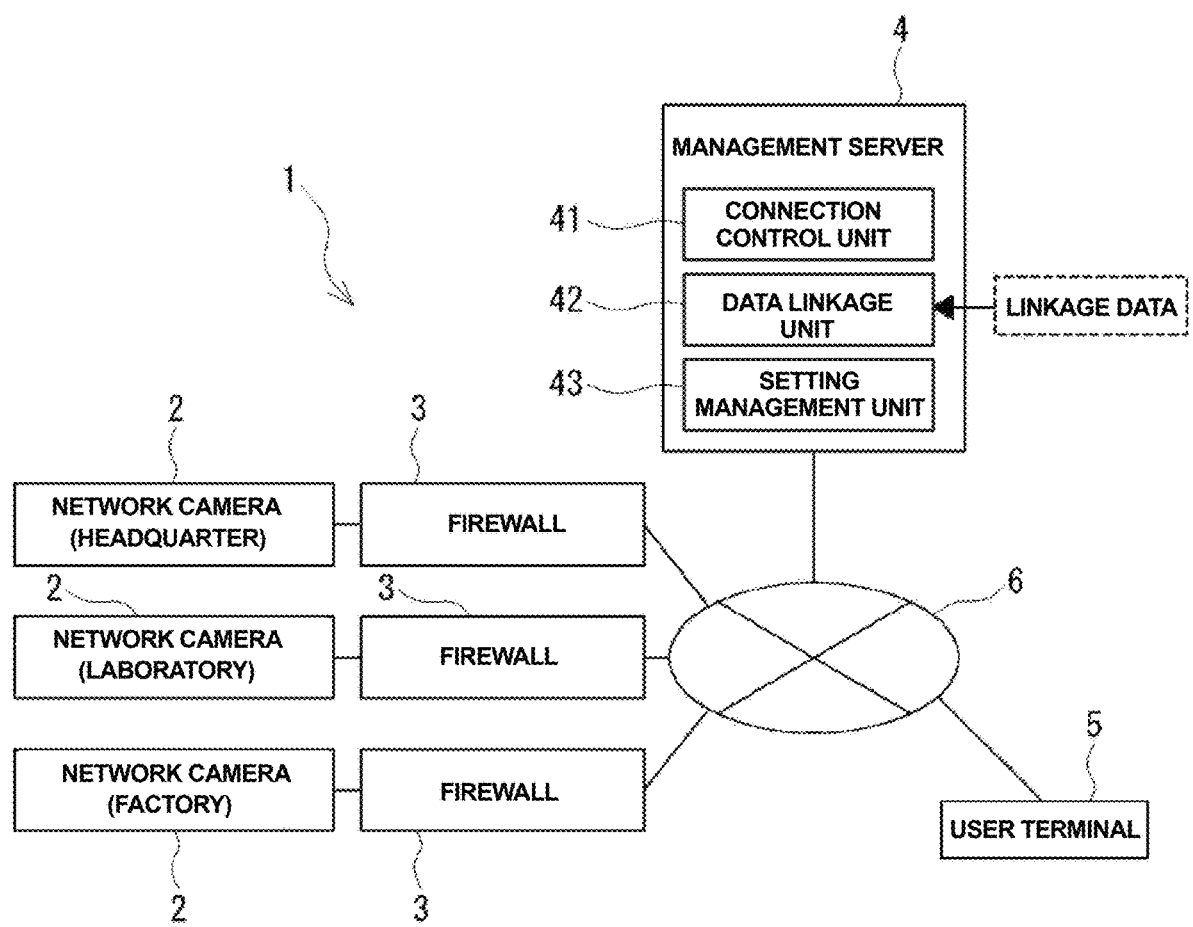
FIG. 5 is an explanatory diagram showing a configuration of an information management system according to a second embodiment.

The second embodiment is one example in which the configuration of the information management system 1 is changed as shown in FIG. 5. Description of the same configuration and action effect as in the first embodiment will be omitted.

The information management system 1 includes a plurality of network cameras 2 and a plurality of firewalls 3. In the present embodiment, as an example, the system 1 has three network cameras 2 and three firewalls 3 connected to the cameras 2. In such a configuration, when the management server 4 allows the user terminal 5 to connect to the plurality of network cameras 2, the user terminal 5 displays one or more of the plurality of network cameras 2 that can be connected to the user terminal 5, and the user can select one of the displayed network camera 2 to be connected.

When the information management system 1 of the present embodiment is applied to a company (Company X), the three network cameras 2 may be installed in respective departments (e.g., a headquarter, a laboratory, a factory) of Company X. Employee Y, who is a user, belongs to the laboratory, and is a manager and spends a lot of time at the headquarter for management meetings, etc. thus, employee Y is allowed to check the state of his workplace by the network camera 2 installed in the laboratory. For example, if there is an employee who works overtime until late night, employee Y may ask the employee about his/her work status and encourage him/her to reduce working hours.

For example, when employee Y is transferred to the headquarter due to a personnel change, employee Y is no longer able to check the video and audio of the network camera 2 installed in the laboratory, while employee Y is allowed to check the video and audio of the network camera 2 installed at the headquarter. In addition, if employee Y retires from Company X, he will not be able to use Company X's system.

This is because the data in the setting management unit 43 of the management server 4 is updated by uploading the linkage data generated based on personnel change data at Company X (i.e., data generating information of the network cameras 2 which respective employees of Company X are allowed to use).

Third Embodiment

The third embodiment is one example in which the configuration of the information management system 1 is changed as shown in FIGS. 6 and 7. Description of the same configuration and action effect as in the first embodiment will be omitted.

As shown in FIG. 6, a firewall 3 further includes an AI processing unit 308, a firewall state management unit 309, and an IoT linkage unit 310.

The AI processing unit 308 performs AI (Artificial Intelligence) processing on a video/audio (including recorded video/audio) of the network camera 2 according to a learning model. The setting management unit 301 manages information related to the learning model necessary for the AI processing at the AI processing unit 308, registers, updates, and deletes the learning model.

When an error occurs in each function of the firewall 3, the firewall state management unit 309 acquires error log information. Further, upon acquiring the error log information, "date, time, minute, and second" of the occurrence of the error, "identification information of the firewall" in which the error occurred, a "function identifier of the firewall" in which the error occurred, and the like are transmitted to the management server 4 in addition to the "error log information".

The IoT linkage unit 310 controls communication between the firewall 3 and the IoT device (i.e., a connected device 30) connected to the firewall 3. Specifically, the IoT linkage unit 310 receives information acquired by the IoT device from the IoT device and transmits operation information for the IoT device received from the user terminal 5 to the IoT device.

As shown in FIG. 7, the user terminal 5 further includes an AI linkage unit 508, an IoT information confirmation unit 509, and an IoT operation unit 510.

The AI linkage unit 508 displays, on the screen of the web application, an alert detected by the AI processing of the AI processing unit 308 in the firewall 3. Further, a video and/or an audio based on the AI processing results of the AI processing unit 308 of the firewall 3 is displayed or played back by the Web application. Further, the AI linkage unit 508 provides a function of performing operations related to AI processing of the AI processing unit 308 of the firewall 3 through the screen of the Web application.

The IoT information confirmation unit 509 displays information acquired from an IoT device (i.e., a connected device 30) connected to the firewall 3 on the Web application screen. Further, information related to an occurrence of an error of each function detected by the firewall state management unit 309 in the firewall 3 is displayed on the screen of the Web application. If necessary, error log information is also displayed.

The IoT operation unit 510 provides a function of operating the IoT device (i.e., the connected device 30) connected to the firewall 3 through the web application screen.

Next, an example of using a data channel (a data channel processing unit 307 of the firewall 3 and a data channel processing unit 507 of the user terminal 5) in the information management system 1 of the above-described configuration will be described.

<Data Channel Use Case 1>

As described in the first embodiment, the network camera 2 can be remotely controlled by transmitting operation information for the network camera 2 by the user terminal 5 to the firewall 3. For example, zoom, swing, and the like of the network camera 2 can be controlled, or the shooting mode of the network camera 2 can be changed.

<Data Channel Use Case 2>

A system administrator can transmit a program file or the like for updating an application in the firewall 3 by the user terminal 5 to the firewall 3 and start the program file or the like. Further, a system administrator can remotely change settings of the firewall 3 by the user terminal 5.

<Data Channel Use Case 3>

When a temperature sensor, GPS, and the like are installed inside the firewall 3, the temperature, location information, and the like of the firewall 3 can be checked at the same time when checking the image of the network camera 2 using the user terminal 5. Further, when an external sensor (i.e., a connected device 30) is connected to the firewall 3, information on the external sensor connected to the firewall 3 can be checked using the user terminal 5. Further, when some information (for example, a door has been opened illegally) is detected by the external sensor, an alert can be sent from the firewall 3 to the user terminal 5 to notify the user of the incident.

<Data Channel Use Case 4>

When a device such as a robot arm (i.e., a connected device 30) is connected to the firewall 3, such a device can be remotely controlled while checking the image of the network camera 2 from the user terminal 5.

<Data Channel Use Case 5>

In the firewall 3, the image of the network camera 2 may be analyzed by AI processing. Then, if some information (for example, a suspicious person) is detected in the image of the network camera 2, an alert can be sent from the firewall 3 to the user terminal 5 to notify the user of the incident. Further, in addition to providing an alert to the user, the connected device 30 connected to the firewall 3 can be operated according to a predetermined rule based on the contents detected by the AI processing.

Other Embodiments

The present disclosure is not limited to the above embodiments, and the present disclosure can be implemented in various aspects without departing from the technical concept.

(1) In the above embodiment, the network camera 2 was used as a device having at least one of an image capturing function and a sound collecting function, but as long as the network camera is a device having an image capturing function and a sound collecting function, various other devices may be used. Further, the network camera 2 (a camera with a sound collecting microphone), which is a device having both an image capturing function and a sound collecting function, was used, but a device having only an image capturing function or a device having only a sound collecting function may be used.

(2) In the above embodiment, both the video and the audio of the network camera 2 was able to be checked from the user terminal 5, but for example, only the video of a device such as a network camera may be checked, or only an audio may be checked.

(3) In the above embodiment, a storage device having a recording function is built into the firewall 3, and the video/audio of the network camera 2 is recorded. However, a device such as a network camera may have a recording function. Alternatively, a recording device (a recorder) having a recording function may be disposed between a device such as a network camera and a firewall.

For example, the video captured by a device such as a network camera or the sound collected may be recorded with a recording device or the like, and the recorded video or the recorded audio may be transmitted to the user terminal via (transparent) a firewall. With such a configuration, when a plurality of users are connected at the same time in a single device such as a network camera, it is possible to avoid such a situation where the ability to transmit video and audio is insufficient and the number of users who can use the system is restricted.

(4) In the above embodiment, the firewall 3 is configured as an independent device, and the network camera 2 and the firewall 3 are separately formed with each other. However, a firewall function may be built into a device such as a network camera and the above-described recording device such that both the devices are integrally formed. Further, a firewall function may be incorporated into a network device such as a router that interconnects different networks.

(5) The functions of one component in the above embodiment may be distributed as a plurality of components, or the functions of the plurality of components may be integrated into one component. Further, a part of the configuration of the above embodiment may be omitted. Further, at least a part of the configuration of the embodiment may be added, replaced, or the like with the configuration of another embodiment. In addition, all aspects included in the technical concept specified from the wording described in the claims are embodiments of the present disclosure.

The invention claimed is:

1. An information management system, comprising:
 a firewall that is connected to a device having at least one of an image capturing function and a sound collecting function; and
 a management server that is configured to:
  perform an authentication process to authenticate a user who uses a user terminal between the user terminal and the management server; and
  allow the user terminal to connect to the device via the firewall, wherein
  the user terminal for which the authentication process was performed by the management server is allowed to transmit and receive, via the firewall between the user terminal and the device to which the user terminal is allowed to connect via the firewall based on a connection permission condition that is defined in the manager server, media data including at least one of a video captured by the device and an audio collected by the device,
  WebRTC technology is used for communication between the user terminal and the firewall,
  P2P communication between the user terminal and the firewall is established using the management server as a signaling server, and
  the firewall has a transparency setting function of performing a transparency setting for the firewall based on a SDP (Session Description Protocol) such that, when establishing P2P communication between the user terminal and the firewall using WebRTC technology, (i) the user terminal can connect to the device via the firewall using information related to the user terminal and the firewall that is exchanged, via the management server as the signaling server, between the user terminal and the firewall and (ii) the media data of the device can be transmitted and received between the device and the terminal device via the firewall.

2. The information management system according to claim 1, wherein the connection permission condition is defined by connection basic information that is set in advance in the management server and linkage information that is information having a higher priority over the connection basic information and is acquired by the management server from an outside.

3. The information management system according to claim 1, wherein the user terminal and the firewall are configured to control a media channel used for transmitting and receiving the media data of the device between the user terminal and the firewall.

4. The information management system according to claim 1, wherein the user terminal and the firewall are configured to:
 transmit and receive data other than the media data of the device between the user terminal and the firewall; and
 control a data channel used for transmitting and receiving the data between the user terminal and the firewall.

5. The information management system according to claim 4, wherein the user terminal is configured to remotely operate the device connected to the firewall by transmitting and receiving the data between the user terminal and the firewall.

6. The information management system according to claim 1, wherein the SDP includes an Offer SDP that is transmitted from the user terminal.

7. The information management system according to claim 6, wherein
the user terminal is further configured to transmit the Offer SDP to the management server, and
the management server is further configured to transmit the received Offer SDP to the firewall.

8. The information management system according to claim 7, wherein the user terminal does not transmit the Offer SDP directly to the firewall.

9. The information management system according to claim 1, wherein the SDP includes an Answer SDP that is transmitted from the firewall.

10. The information management system according to claim 9, wherein
the firewall is further configured to transmit the Answer SDP to the management server, and
the management server is further configured to transmit the received Answer SDP to the user terminal.

11. The information management system according to claim 10, wherein the firewall does not transmit the Answer SDP directly to the user terminal.

* * * * *